Patented June 2, 1942

2,284,804

UNITED STATES PATENT OFFICE 2,284,804

CHEWING GUM BASE AND METHOD OF PREPARING SAME

Frank T. De Angelis, West Brighton, N. Y., assignor to L. A. Dreyfus Company, Staten Island, N. Y., a corporation of New York No Drawing. Application October 28, 1940, Serial No. 363,207

14 Claims. (Cl. 99—135)

This invention relates to chewing gum base compositions and methods of preparing same, and is more particularly concerned with such chewing gum bases of stable character produced from materials available in continental North America.

Chewing gum bases have heretofore been produced from natural gums in combination with synthetic and natural resins, the natural gums usually being of such character as chicle, jelutong, guttas and rubber, which may for these purposes be generally referred to as rubber type gums. All of these natural gums are affected by oxidation and become crumbly and brittle on prolonged storage. Furthermore, they are attacked by various flavoring oils commonly employed in the production of chewing gums, which render them soft and tacky. Many sources of supply of such natural gums are located in the Far East and the supply is uncertain and of varying character and quality due to the conditions of collection.

But the characteristics peculiar to chewing gum bases are quite exacting and production of satisfactory bases even from materials referred to above, has required extensive development. The utilization of novel materials for chewing gum base production entailed difficulties because of the exacting requirements in this field.

Among the objects of the present invention is the production of chewing gum bases built from readily available materials of continental North America which are stable and devoid of the undesirable characteristics of compositions containing natural gums.

Still further objects and advantages of the present invention will appear from the more detailed description given below, it being understood, however, that such more detailed description is given by way of illustration and explanation only and not by way of limitation, since various changes therein may be made by those skilled in the art without departing from the scope and spirit of the present invention.

In accordance with the present invention, chewing gum base compositions are prepared from polymers of olefines and for that purpose polybutene is desirably employed because of its availability and other desirable characteristics, and such polybutene is utilized herein as exemplary of an essential component of bases produced in accordance with the present invention. Such polymers are available in varying molecular weights depending on the polymerization reaction. Polybutene, for example, is available in molecular weights of from 1000 to 150,000. Any such polybutene may be utilized in accordance with the present invention. Polybutene is peculiarly suited for use in chewing gum base compositions because of its inherent properties, its capacity of resisting oxidation and of being unharmed by any of the flavoring oils normally used in chewing gum compositions.

For utilization for chewing gum base compositions, the polybutene is employed in combination with resins either synthetic or natural, with or without the inclusion of any of the rubber type gums. The incorporation of polybutene with such resins or gums offers difficulties. The polybutene is not soluble in or miscible with the usual resins employed in chewing gum base compositions. If one melts the resins and adds the polybutene thereto, it is difficult to produce a compatible composition because of the immiscibility or lack of solubility. It has been found, however, that the polybutene types of materials are compatible with the waxes and they are readily soluble or miscible with each other. Consequently homogeneous compositions desirably utilizable for chewing gum base manufacture may be produced from polybutene with the stated resins and gums if substantial quantities of a wax are utilized in the production of the base, the wax serving to produce ready incorporation of the ingredients with each other in the production of homogeneous compositions. Substantial amounts of wax should be employed for this purpose and the amount of wax should be at least equal to the amount of polybutene present in the composition and generally will exceed that in substantial amounts. The waxes employed may be of any desired type suitable for chewing gum use and for such purposes there may be mentioned paraffin wax, beeswax, Japan wax, spermaceti, ozokerite, ceresin and synthetic waxes, any of such waxes being employed either individually or in any desired combination. For most purposes it is preferred to first combine the polybutene with the wax and introduce the resin into such combination.

The resin component may be any synthetic or natural resin suitable for chewing gum base manufacture including hydrogenated synthetic and hydrogenated natural resins and ester gums.

Where rubber type gums are included in the composition they may be selected from the usual chewing gums such as chicle, jelutong, guttas, rubber, etc.

Softening agents are also frequently desirable under which there may be specifically mentioned vegetable oils, fatty acids and mineral oils, including the unsaturated and hydrogenated types.

In chewing gum base compositions produced with polymerized hydrocarbon gums, the synthetic gum gives a rather unpleasant, slippery sensation during chewing. Further the texture and feel of the base is not comparable with that produced from natural resins or gums. It has been found that improved texture and feel of the chewing gum base composition produced with polybutene for example, is obtainable by the incorporation of a water-insoluble chewing or texturing adjuvant of crystalline character of which calcium carbonate is the best example. Such material may be incorporated in any desired amount sufficient to strengthen the texture of the base and improve its chewing characteristics. The amount employed should be sufficient to give a somewhat rougher and desirable feel to the tongue without producing any unpleasant sensation. Amounts of the order of 5% may thus be utilized.

As indicated above, there are limitations on the proportions of these materials which can be employed in the production of satisfactory chewing gum base materials. Thus the content of polybutene in the composition should not exceed 25% by weight, while the amount of wax employed should be at least equal to that of the polybutene and much larger quantities may be employed, so that amounts of wax of from 25 to 65% by weight of the composition are used. The balance of the base may be chosen from resins and rubber type gums and desired additions of softening agents, etc., where employed.

The following examples illustrate various types of formulations that can be utilized in the production of base compositions to which the usual flavoring and sweetening materials may be added to produce the finished chewing gum, the percentages given in those examples being by weight.

I

| | Percent |
|---|---|
| Polybutene (vistanex of molecular wt. 80,000) | 15 |
| Waxes | 50 |
| Resins | 25 |
| Softeners | 5 |
| Calcium carbonate | 5 |

II

| | Percent |
|---|---|
| Polybutene (vistanex of molecular wt. 16,000) | 15 |
| Waxes | 55 |
| Resins | 30 |

III

| | Percent |
|---|---|
| Polybutene (vistanex of molecular wt. 80,000) | 10 |
| Jelutong | 50 |
| Waxes | 40 |

IV

| | Percent |
|---|---|
| Polybutene (vistanex of molecular wt. 16,000) | 10 |
| Rubber | 5 |
| Chicle | 10 |
| Resins | 30 |
| Waxes | 35 |
| Softeners | 10 |

These materials may be incorporated together to make a chewing gum base in accordance with established practice in the art.

Very high quality chewing gum bases may thus be produced having desired masticatory properties, of substantially uniform physical character, which readily lend themselves to standardization in manufacturing processes.

Having thus set forth my invention, I claim:

1. A chewing gum base comprising polybutene, a resin and a wax, the polybutene not exceeding 25% by weight of the composition and there being at least as much wax as polybutene.

2. A chewing gum base comprising 10 to 20% of polybutene, 25 to 65% of wax and 25 to 50% of resin.

3. A chewing gum base comprising polybutene, a resin, a natural rubber type gum and a wax, the polybutene not exceeding 25% by weight of the composition and there being at least as much wax as polybutene.

4. A chewing gum base comprising polybutene, a natural rubber type gum and a wax, the polybutene not exceeding 25% by weight of the composition and there being at least as much wax as polybutene.

5. A chewing gum base comprising 10% polybutene, 40% wax and 50% jelutong.

6. A chewing gum base comprising 15% polybutene, 55% wax and 30% resin.

7. A chewing gum base comprising polybutene, a resin, a wax and a softener, the polybutene not exceeding 25% by weight of the composition and there being at least as much wax as polybutene.

8. A chewing gum base comprising 15% polybutene, 50% wax, 25% resin, 5% softener and 5% calcium carbonate.

9. A chewing gum base comprising polybutene and an amount of a water-insoluble crystalline adjuvant sufficient to strengthen the texture of the base.

10. A chewing gum base comprising polybutene and 5% calcium carbonate based on said polybutene.

11. The method of preparing chewing gum bases which comprises incorporating polybutene with a resin in the presence of a wax, there being at least as much wax as polybutene.

12. The method of preparing chewing gum bases which comprises incorporating polybutene with a resin and a rubber type gum in the presence of a wax at least equal in amount to that of the polybutene.

13. The method of preparing chewing gum bases which comprises incorporating polybutene with a rubber type gum in the presence of wax at least equal in amount to that of the polybutene.

14. The method of preparing chewing gum bases which comprises incorporating polybutene with a compatible wax to produce a homogeneous composition and then incorporating a resin.

FRANK T. DE ANGELIS.